July 6, 1937.                H. KUDO                2,086,321
SPRING
Filed April 27, 1936

Inventor
Hiojiro Kudo
By Spear, Donaldson & Hall
Attys

Patented July 6, 1937

2,086,321

UNITED STATES PATENT OFFICE 2,086,321

SPRING

Hiojiro Kudo, Nada-ku, Kobe, Japan, assignor to The Kobe Seikosho Company, Limited, Kobe city, Japan Application April 27, 1936, Serial No. 76,654

2 Claims. (Cl. 267—61)

My invention relates to a spring, especially for vehicles. The principal object of this spring is to increase its load carrying capacity.

For this object, a frusto-conical and a cylindrical spiral spring section of equal pitches are fitted, inner and outer, by screwing one within the other, in contact with each other at one end, and separating from each other progressively greater distances towards the other end. The number of spring sections which are to be assembled and the shape of the material of which the sections are made, may be changed according to the particular duty the spring is to perform.

I have illustrated an embodiment of my invention in the accompanying drawing, in which Figure 1 is a plan view of my composite spring consisting of a frusto-conical and a cylindrical spiral section made of steel wire rods square in cross section.

Figure 2:
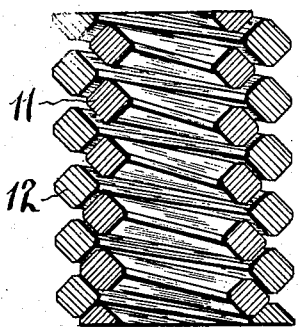
Fig. 2 is a sectional view along the line 2—2 of Fig. 1.
Figure 4:
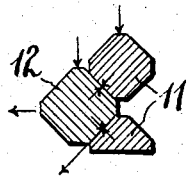
Fig. 4 is a part of Fig. 3 on larger scale, showing the component actions of forces on the inclined surfaces of the sections.
Figure 3:
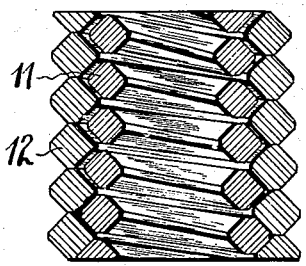
Fig. 3 is the same sectional view as Fig. 2 showing a compressed state due to an imposed load.
Figure 1:
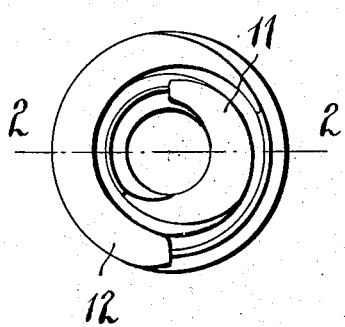

Referring to Figs. 1, 2 and 3, the reference characters 11 and 12 indicate respectively a frusto-conical and a cylindrical spiral spring of equal pitches composed of steel wire rectangular in cross section wound in the general direction of the diagonal of their cross sections. The conical section is so fitted to the inside of the cylindrical section by screwing into place that they are closely in contact with each other at one end of the organization and separate from each other progressively towards the other end of said organization.

When a load is applied to the composite spring a deflection by compression of the outer spring 12 takes place equally all over its length, but the compression of the inner spring 11 is in proportion to its diameter at any given point along its length, that is, the deflection at the bottom, see Figs. 2 and 3, is the greatest and it decreases in proportion to the distance from the bottom. Now, the inner and outer springs will come in contact with each other, step by step, from the bottom to the upper end due to the imposed load, and at the zone where they are in contact with each other, they are compressed downwardly, and also the former conical section is compressed inwardly and the outer cylindrical section is expanded outwardly, due to the horizontal components of a force acted upon their inclined surfaces. A lateral deformation of the inner spring will be very little, as its shape is conical.

At the zone where the inner and the outer springs are in contact with each other, the latter will be stressed or expanded outwardly, and its resistance will react to cause compression of the former downwardly and inwardly. The frictional resistance induced between the spring sections will decrease according to the distance from the small diameter end of the conical spring and the resistance will increase according to load accumulation. Tendency to a permanent setting of the organization is reduced by my organization.

Figure 5:
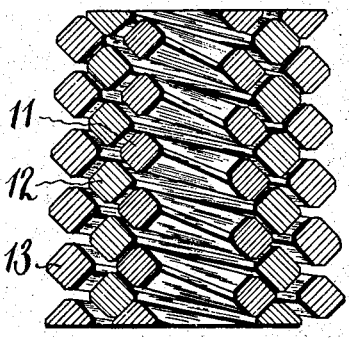
Fig. 5 is a sectional view of a modification of my invention consisting of two frusto-conical spiral spring sections made of steel wire rods equal in cross section.
Figure 8:
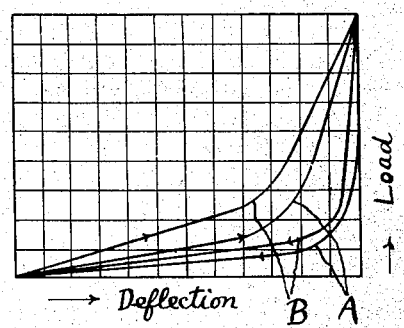
Fig. 8 is a chart of curves showing relations between load and deflection of my invention.

In general, the larger the cross sectional area of the material, the more difficult heat treatments of springs will be, and the manufacturing of springs which are to be subjected to great loads, as for vehicles, is technically very difficult. However, according to my invention, the manufacturing of the organization is easy, because the material is very small in diameter as compared with previously known springs.

Where conical spiral springs 11 and 13 are screwed into place in the organization from opposite ends of a cylindrical spiral spring 12 of Fig. 2, as shown in Fig. 5, the characteristic is better than the above example upon comparison as easily seen from Fig. 8, in which curves A and B indicate relations between load and deflection of the above and the present examples respectively.

Figure 6:
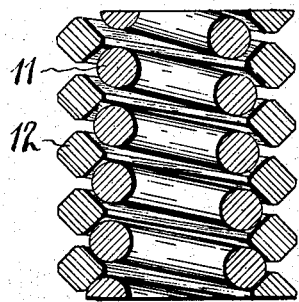
Figs. 6 and 7 are sectional views of modifications showing different cross sectional shapes of wire.

If the conical spiral spring 11 is made by a round steel wire rod as shown in Fig. 6, the manufacturing is rendered easy, and the characteristic of the spring organization is almost similar to that of the first example.

Figure 7:
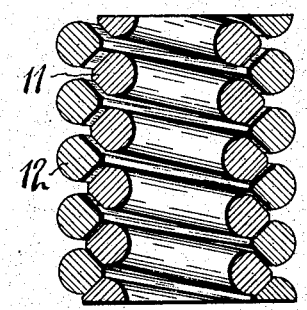

Again, conical and cylindrical spiral spring sections 11 and 12 may be provided with inclined surfaces at their opposing sides only, as shown in Fig. 7, and the general principles involved in the improvement will be maintained.

Having described my invention as above, what I claim is:

1. A spiral spring organization comprising an outer spiral section of generally cylindrical form and an inner spiral section of generally conical form screwed into the outer section, the said sections at one end being initially in contact and diverging from each other towards the other end with progressively enlarged spacing between the opposed surfaces of said sections, substantially as described.

2. A spiral spring organization comprising an outer spiral section of generally cylindrical form and an inner spiral section of generally conical form screwed into the outer section, the said sections having inclined faces at their opposing sides only, said faces being in contact at one end of the organization and spaced apart at greater distances progressively towards the other end of the organization.

HIOJIRO KUDO.